Figure 1:
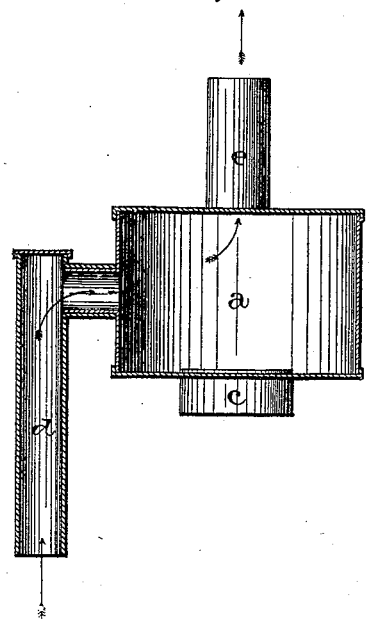
Figure 2:
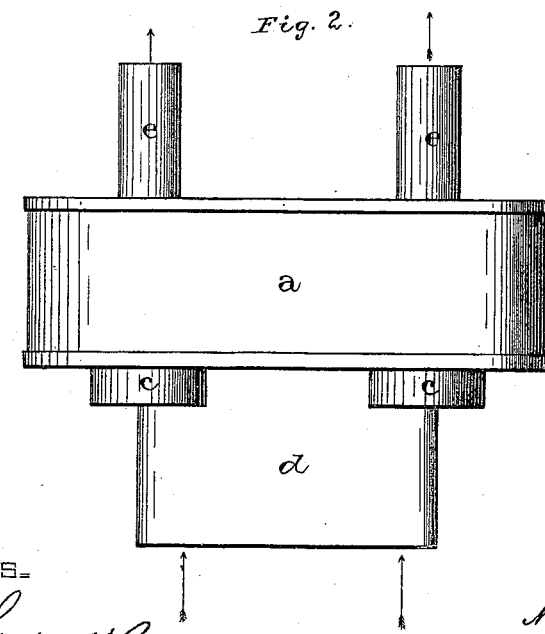

M. WATERBURY.
PORTABLE HEATER.

No. 186,911. Patented Jan. 30, 1877.

WITNESSES:
J. Wm. Garner
F. M. Burnham.

INVENTOR:
M. Waterbury
per
F. A. Lehmann, atty.

UNITED STATES PATENT OFFICE.

MILAN WATERBURY, OF MASON CITY, IOWA.

IMPROVEMENT IN PORTABLE HEATERS.

Specification forming part of Letters Patent No. 186,911, dated January 30, 1877; application filed August 2, 1876.

*To all whom it may concern:*

Be it known that I, MILAN WATERBURY, of Mason City, in the county of Cerro Gordo and State of Iowa, have invented certain new and useful Improvements in Portable Heaters; and I do hereby declare the following to be a full, clear, and exact description of the invention, such as will enable others skilled in the art to which it pertains to make and use it, reference being had to the accompanying drawings, which form part of this specification.

My invention relates to an improved heating attachment for stoves; and it consists in a cold-air pipe for taking in fresh air from near the floor, a heating-chamber to be placed on the stove, and in which the air is to be heated, and one or more warm-air pipes for conducting the air upward, as will be more fully described hereinafter.

The accompanying drawing represents my invention.

$a$ represents a hot-air chamber, which may be of any form preferred, and which is intended to set on the top of any flat-topped stove. This chamber may be just large enough to cover a small portion of the stove, one-quarter, a half, or the whole of it, as may be preferred, and can be used equally well on cooking and all box-shaped stoves. When used on cooking-stoves there may be flanges $c$ formed on the under side of the chamber to go down through the holes, so as to get the full effect of the fire. Connected to one or both sides of this chamber is a cold-air pipe, $d$, either wide and flat, as here shown, or any other form that may be preferred, and which reaches a suitable distance down toward the floor, and carries up cold air into the chamber $a$. After the air becomes heated in the chamber it rises through one or more pipes, $e$, and may escape directly into the room, or, by means of other pipes, be conveyed to other rooms in other parts of the house.

By having the pipe $d$ extend down near to the floor the air is taken from that part alone, and thus an active circulation is constantly kept up in the room.

It will be-noticed that this device is light and portable, and can be placed on and taken from the stove, or transferred to another stove at will.

I am aware that a heating-chamber has heretofore been applied to drums and stoves, and this I disclaim. I limit my invention to the device shown.

I claim as my invention—

A portable heater to be applied to stoves, consisting of the chamber $a$, cold-air pipe $d$, and hot-air pipe or pipes $e$, the cold-air pipe being made to extend down near to the floor, so as to cause a constant circulation of air in the room, as shown and described.

In testimony that I claim the foregoing I have hereunto set my hand this 25th day of July, 1876.

MILAN WATERBURY.

Witnesses:
ALEX. CAMPBELL,
F. Z. HICKS.